April 16, 1940.  F. M. PENNING  2,197,079
METHOD AND DEVICE FOR MEASURING PRESSURES
Filed Oct. 21, 1936  2 Sheets-Sheet 2

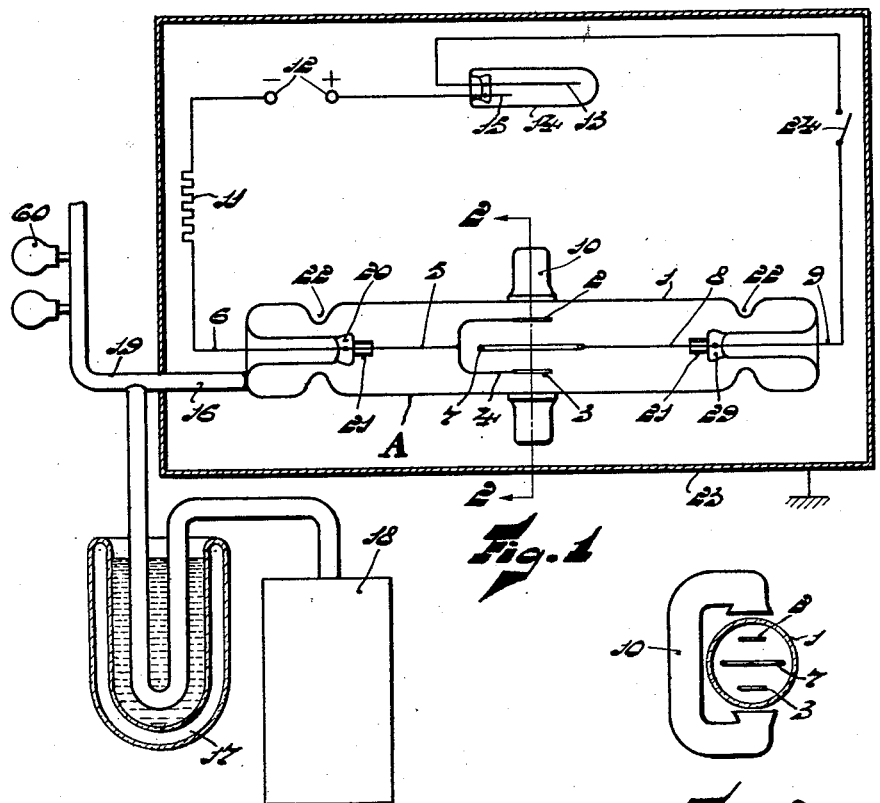
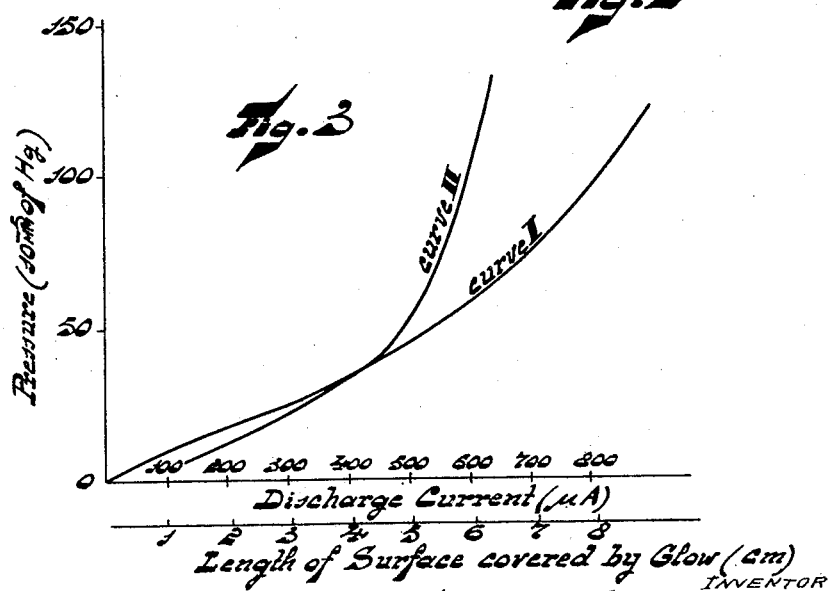

INVENTOR
F. M. PENNING
BY E. F. Wendroth
ATTY.

Patented Apr. 16, 1940

2,197,079

UNITED STATES PATENT OFFICE 2,197,079

METHOD AND DEVICE FOR MEASURING PRESSURES

Frans Michel Penning, Eindhoven, Netherlands, assignor to N. V. Philips' Gloeilampenfabrieken, Eindhoven, Netherlands Application October 21, 1936, Serial No. 106,915
In Germany May 28, 1936

12 Claims. (Cl. 175—183)

My invention relates to a method and device for measuring gas pressure, particularly pressures of the order of 0.01 millimeter of mercury and less.

Low gas pressures cannot be measured with the simple apparatus used for measuring higher pressures, and are usually measured with a MacLeod manometer. Such a manometer, however, has several drawbacks, for instance, it is rather inaccurate for reading very low pressures, a relatively long time is required to adjust the level of the mercury, and it is impossible to continuously follow the variations of a varying pressure. Such a manometer has the additional drawbacks that it can not be used to measure the pressure of a condensable vapor such as water vapor, and a cooling device with liquid air must be connected between the manometer and the vessel containing the gas to be measured in order to prevent mercury vapor from passing from the manometer into the vessel. Furthermore, if a MacLeod manometer is used with a diffusion pump which employs organic vapors instead of mercury, mercury vapor may pass from the manometer into the pump and deleteriously affect the operation of the pump.

Although other apparatus, such as the ionization manometer, are also used for determining low gas pressure, their operation is involved and time-consuming, whereas the apparatus itself is cumbersome and expensive.

The object of my invention is to overcome the above disadvantages and to provide a simple method and device with which low gas or vapor pressures may be accurately and quickly determined.

Another object of my invention is to provide a measuring device by which the variations in pressure of a low-pressure gas or vapor may be followed.

In accordance with the invention, I obtain the absolute or relative values of such low-pressures from the current intensity of a glow discharge taking place in the gas to be measured.

As in a very low-pressure gas the ignition voltage of a glow discharge is so high as to make it difficult or impossible to effect the ignition with practical apparatus, and as the current intensity of the discharge is so small that it could only be measured by an extremely sensitive apparatus, I provide magnetic means to produce a magnetic field of such shape and intensity, and so shape and locate the electrodes that the current intensity is amplified and the ignition voltage is decreased more than ten times, or even for more than hundred times.

For this purpose, I so dimension and arrange the electrodes and magnetic field that, at the time of ignition and during the discharge, the electrons are prevented from passing directly to the anode along the electric lines of force and are forced to travel along considerably longer paths than if the magnetic field were not present. More particularly, I so arrange the electrodes and a magnetic field of sufficient strength that, in at least part of the discharge chamber, the magnetic lines of force extend substantially perpendicularly to the electric lines of force. The magnetic and electric lines of force need not be exactly perpendicular to each other, as under many conditions good results are obtained with smaller angles, for example, angles larger than 40°, and in some cases even better results are obtained if they are not exactly perpendicular to each other, but form an angle differing by a few degrees from a right angle.

In one embodiment, I use parallel flat electrodes or coaxial cylindrical electrodes and a magnetic field arranged with its lines of force perpendicular to the shortest connecting lines between these electrodes. In such cases the magnetic lines of force are normal to the electric lines of force in the entire discharge chamber at the ignition as well as during the discharge. In another embodiment, I use a cathode having two portions connected by a beam of magnetic lines of force, and an anode located outside this beam. For example, I use as the cathode, two plates arranged normally to the magnetic lines of force, and as the anode, or at least a part thereof, a wire or plate arranged parallel to the magnetic lines of force, or a cylinder which may completely enclose the space between the two cathode plates. The anode may also consist of a wire frame encircling the beam of magnetic lines of force connecting the cathode plates.

I measure the value of the glow-discharge current in various ways, for instance by passing this current through an indicating glow-discharge tube having a rod-shaped cathode; the extent to which this cathode is covered with glow being a visible indication of the current intensity and thus of the pressure of the gas being measured. With a constant magnetic field strength and constant voltage, the intensity of the discharge current depends on the nature of the gas being measured and this relation between pressure and discharge current intensity may be determined and, the indicating tube for example, may be calibrated for each gas. It is frequently necessary to make only relative measurements of the gas pressure, in which case it is only necessary to follow the variation of the pressure, which may be determined in a simple manner from the variations of the discharge-current intensity, for example, by merely observing the extent of the luminous covering on the indicating-tube cathode.

In order that my invention may be clearly understood and readily carried into effect, I shall describe same in more detail with reference to the accompanying drawings in which:

Figure 1 is a diagrammatic view of a pressure-measuring device according to the invention;

Fig. 2 is a sectional view taken on line 2—2 of Fig. 1;

Fig. 3 is a graph showing calibration curves for the device of Figs. 1 and 2;

Figure 4:
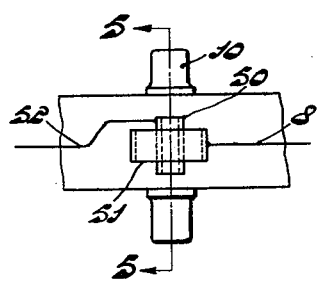
Fig. 4 is a view of a discharge tube having electrodes according to another embodiment of the invention.

The device shown in Figs. 1 and 2 comprises a glow-discharge tube A having a cylindrical-shaped glass envelope 1 forming two pinches 20 and 29. Within the envelope are two rectangular-shaped parallel metallic plates 2 and 3, for instance of nickel, connected by a U-shaped strip 4 and supported from pinch 20 by a supporting conductor 5 connected to a current supply wire 6. Between plates 2 and 3 and supported from press 29 by a supporting conductor 8 connected to a current supply wire 9, is an anode 7 formed as a rectangular frame having a larger length and width than the plates 2 and 3, and consisting of a metal wire.

As the insulation resistance between wires 5 and 6 may be deleteriously affected by the depositing upon the inner surface of envelope 1 of particles disintegrating from the plates 2 and 3, pinches 20 and 29 are provided with short glass tubes 21 extending over wires 5 and 8 and closely surrounding same, and the envelope 1 is provided with annular contractions 22.

Arranged outside the envelope 1 so as to produce a large number of magnetic lines of force passing through one of the plates 2 and 3 to the other plate is a permanent magnet 10, although an electromagnet may be used. It should be noted that frame 7 is located outside the beam of the magnetic lines of force passing through plates 2 and 3 and encircles same.

The magnetic field prevents the electrons flowing from one of the cathode portions 2—3 from traveling along the electric lines of force to the anode 7, but compels these electrons to travel in the direction of the magnetic lines of force, or to perform a helical movement around same. Upon arriving in the neighborhood of the second cathode portion, movement of the electron is braked and they are repelled, i. e., they return towards the first cathode portion. Consequently, the electrons move back and forth between the cathode portions until they are finally deviated towards the anode under the influence of the electric field, and thus substantial increase in the length of the path traversed by the electrons and an increase of intensity of the discharge current are obtained. This influence on the path of the electrons is also exerted by the magnetic field on the electrons which bring about the ignition.

The current supply wire 6 is connected through a high resistance 11 to the negative terminal of a suitable D. C. supply 12 having its positive terminal connected to the anode 15 of an indicating glow-discharge tube 14 whose cathode 13 is connected through a switch 24 to the wire 9. In some cases it might be advisable to shunt switch 24 by a high resistance, for example of $10^9$ ohm, so that when the switch is open a very small current flows through the circuit, this current avoiding a delay in the ignition of the discharge, which sometimes occurs. As the D. C. source 12, a device similar to the plate-voltage supply apparatus used for radio sets may be employed.

The tube 14 is of such construction that it is adapted to transform current variations into light variations whereby the current variations are indicated by the extent to which the glowing layer covers the cathode 15. As the construction of such tubes is well known in the art, further description of same is believed unnecessary.

The device shown in Figs. 1 and 2 was constructed with the following values: diameter of envelope 1 about 35 mm.; length and width of the plates 2 and 3 about 15 and 10 mm. respectively; spacing between plates 2 and 3 about 20 mm.; length and width of the frame 7 about 40 and 25 mm. respectively; strength of magnetic field between plates 2 and 3 about 350 Oersted; resistance 11 about 1 megohm, and voltage of supply 12 about 2000 volts.

Connected to vessel 1 through a tube 16 and a Dewar vessel 17 filled with liquid air, is a vacuum pump indicated by 18. The tube 16 is provided with an extension 19 to which one or more bodies to be exhausted, for instance incandescent lamps 60 or discharge tubes, are connected. The tube A may be permanently connected to the pump in the manner shown.

Figure 6:
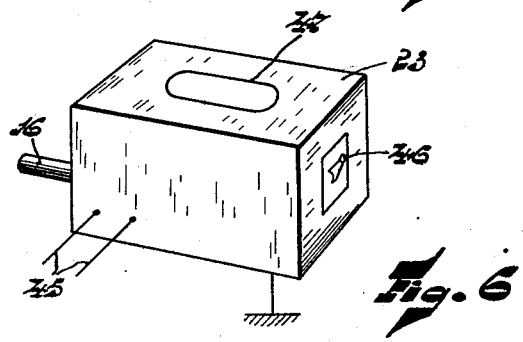
Figs. 6 and 7 are perspective views of housings enclosing the apparatus shown in Figs. 1 and 2.

The source 12, tube A, magnet 10, tube 13, resistance 11, switch 24, and the connecting leads are preferably enclosed by a grounded metallic housing as shown in Fig. 6. As shown in this figure, only the tube 16 serving for the connection of the bodies to be exhausted, and the low-voltage supply leads to source 12, indicated by reference numeral 45, protrude from the housing 23. The housing 23 is provided with a lever 46 for actuating switch 24 and with a window 47 for observing the glowing layer on the cathode 13.

Figure 7:
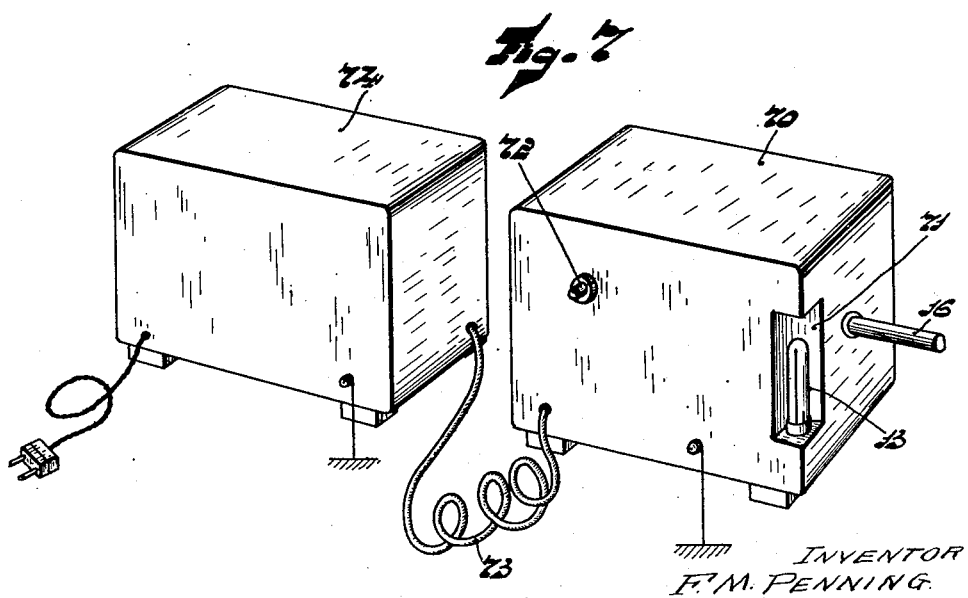

As shown in Fig. 7 tube A, magnet 10, resistance 11 and switch 24 may be enclosed by a grounded metallic housing 70 from which the tube 16 produces. The tube 13 is located in a niche 71 formed in the corner of the housing, the wall of this niche forming a good background in observing the glow in the tube 13. The housing 70 is provided with a press button 72 for actuating switch 24 and is connected with current source 12 by the highly insulated wire 73. The source 12 consists of a device similar to the plate voltage supply apparatus used for radio sets and is enclosed by a grounded metallic housing 74. It may be advantageous to ground one of the poles of source 12 and one of the electrodes of tube A so that only one insulated connection between source 12 and tube A is necessary.

Another way of facilitating the observation of the glow in tube 13 consists in surrounding this tube by a cylinder provided with a longitudinal slit, the inner side of the cylinder wall being blackened. Preferably this cylinder is mounted rotatable so that observation from various directions is made possible.

When the pump 18 (see Fig. 1) has exhausted the bodies to a low pressure, the switch 24 may be closed in order to test said pressure. As described above, the glow discharge between anode 7 and the cathode plates 2 and 3 is initiated more readily, and the intensity of the discharge current in tube A has a higher value than if the magnetic field were not present. The discharge current of tube A then passes through the indicating tube 14, whereby cathode 13 is covered to a smaller or greater extent by the glow. The length to which the cathode 13 is covered is a measure of the discharge current, which in turn is a measure of the gas pressure in the tube 1, and thus in the bodies being exhausted.

In order to define (by means of simple observation or with the aid of a spectroscope) the kind of gas present in tube A, it may be desirable to mount the latter in such a way that the discharge in this tube can be observed. For this purpose the housing may be provided with an opening through which this discharge can be seen. During the lifetime of tube A the inner side of the tube wall may be blackened by particles disintegrated from the electrodes whereby the observation of the discharge is hindered. This drawback may be avoided by providing tube A with a narrow side tube so arranged that the wall of the side tube remains at least partly free of these disintegration products.

It is not always necessary that the determination of the discharge current takes place in such a way that the strength of the current is made visible to the eye. The discharge current of tube A may also be utilized for actuating a relay, e. g. in cases in which the gas pressure within a body must be automatically maintained below a maximum value. This may be the case with mercury vapour rectifiers. As is known certain types of such rectifiers are constantly connected to a vacuum pump, which is put into operation when the pressure of the gas in this rectifier becomes too high. Now such a rectifier may be provided with a device according to the invention, the arrangement being so selected that when the gas pressure attains the maximum admissible value, the discharge current corresponding to this pressure actuates a pump through suitable control means.

Furthermore, by altering the strength of the magnetic field, it is possible to obtain different measuring ranges for the indication tube 14, this being effected in a simple manner by using an electromagnet instead of the permanent magnet 10.

In Fig. 3 curve I indicates for a device having the above values, the ratio between the discharge current and the pressure of the gas in vessel A if this gas is air, whereas curve II indicates the ratio between the length L to which the cathode 13 is covered with glow and the pressure of the air. Thus with the length L known, the pressure of the air may be determined from curve II; however a scale may be provided upon tube 14 upon which the pressure may be read directly.

The apparatus may be utilized for many purposes without the use of the scale or curves. For example, by observing the extent of the glowing layer on cathode 13, the variation in the pressure of the gas in a vessel being exhausted may be followed. Thus, for example, any outbreak of gas within the vessel being exhausted and any leak is made visible at once by the glowing layer.

Figure 5:
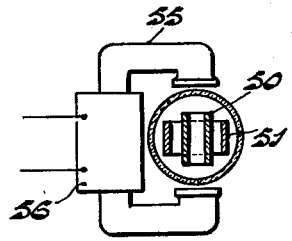
Fig. 5 is a sectional view taken on line 5—5 of Fig. 4.

Another construction of the electrodes of the glow discharge tube A is shown in Figs. 4 and 5 in which the cathode has the form of a cylindrical body 50 whereas the anode has the form of a cylinder arranged coaxially with the body 51. In this construction the magnetic field is supplied by an electromagnet having a core 55 and a coil 56, and the magnetic lines of force extend perpendicularly to the shortest line between the bodies 50 and 51.

It should be noted that the invention makes it possible to determine the pressure of a condensable vapor, which can not be done with the MacLeod manometer, and in addition, the discharge tube A may be directly connected to the body being exhausted without the interposition of a cooling device with liquid air for retaining the mercury vapor. Furthermore, the invention is of particular importance for use with modern diffusion pumps operating with organic vapors instead of mercury, as the use of a MacLeod manometer with such a pump gives rise to the passage of mercury vapor from the manometer into the pump, which should be avoided with such pumps. This danger does not exist when use is made of the manometer according to the invention.

While I have described my invention in connection with specific constructions and application, I do not wish to be limited thereto, but desire the appended claims to be construed as broadly as permissible in view of the prior art.

What I claim is:

1. In a device for measuring the pressure of a gas from the current intensity of a glow discharge taking place in the gas, a discharge tube comprising an envelope provided with an opening for the introduction of the gas, an anode and a cathode having two portions, and means to produce a beam of magnetic lines of force connecting said cathode portions, said anode being disposed between said portions and outside of said beam.

2. In a device for measuring the pressure of a gas from the current intensity of a glow discharge taking place in the gas, a discharge tube comprising an envelope provided with an opening for the introduction of the gas, and two electrodes spaced apart within said envelope to form a discharge space, and magnetic means to produce in said discharge space a magnetic field whose lines of force form an angle greater than 40° with the electric lines of force produced between said electrodes.

3. In a device for measuring the pressure of a gas from the current intensity of a glow discharge taking place in the gas, a discharge tube comprising an envelope provided with an opening for the introduction of the gas, two electrodes spaced apart within said envelope to form a discharge space, and magnetic means for producing in the discharge space a magnetic field whose lines of force extend substantially perpendicular to the shortest line connecting said electrodes.

4. In a device for measuring the pressure of a gas from the current intensity of a glow discharge taking place in the gas, a discharge tube comprising an envelope provided with an opening for the introduction of the gas, a cathode having two parallel portions and an anode, and magnetic means to produce a beam of magnetic lines of force connecting said cathode portions, said anode having a portion extending substantially parallel to said lines of force and spaced from said cathode portions to form a discharge space.

5. In a device for measuring the pressure of a gas from the current intensity of a glow discharge taking place in the gas, a discharge tube comprising an envelope provided with an opening for the introduction of the gas, a cylindrical anode and a cylindrical cathode arranged coaxially and spaced apart to form a discharge space, and means to produce in said discharge space a beam of magnetic lines of force extending substantially perpendicularly to the shortest line connecting said cathode and anode.

6. A device for measuring gas pressures comprising, a glow discharge tube adapted to be filled with the gas to be measured and comprising two electrodes spaced apart to form a discharge space, means to produce a discharge between said electrodes, magnetic means to produce in the discharge space a magnetic field whose lines of force form an angle of more than 40° with the electric lines of force, and means to determine from the intensity of the discharge current the pressure of the gas.

7. A device for measuring gas pressures comprising, a glow discharge tube adapted to be filled with the gas to be measured and comprising two electrodes spaced apart to form a discharge space, means to produce in the discharge space a magnetic field whose lines of force extend substantially perpendicularly to the electric lines of force, and means to determine from the intensity of the discharge current the pressure of the gas.

8. A device for measuring gas pressure comprising, a glow discharge tube adapted to be filled with the gas to be measured and comprising two parallel electrodes spaced apart to form a discharge space, means to produce a discharge between said electrodes, magnetic means to produce in the discharge space a magnetic field whose lines of force extend perpendicularly to the shortest connecting line between said electrodes, and means to determine from the intensity of the discharge current the pressure of the gas.

9. A device for measuring gas pressures comprising, a glow discharge tube adapted to be filled with the gas to be measured and comprising an anode and a cathode having two parallel portions, means to produce a discharge between said anode and cathode, magnetic means to produce a beam of magnetic lines of force connecting said cathode portions, said anode having a portion extending parallel to said lines of force, and means to determine from the intensity of the discharge current the pressure of the gas.

10. A device for measuring gas pressures comprising, a glow discharge tube adapted to be filled with the gas to be measured and comprising a cylindrical anode and a cylindrical cathode arranged coaxially, means to produce a discharge between said anode and cathode, magnetic means to produce a beam of magnetic lines of force extending perpendicularly to the shortest line connecting said anode and cathode, and means to determine from the intensity of the discharge current the pressure of the gas.

11. A device for measuring gas pressures comprising a glow discharge tube adapted to be filled with the gas to be measured and comprising two electrodes, means to produce a discharge between said electrodes, magnetic means outside said tube to produce in the discharge space a magnetic field to decrease the ignition voltage and increase the current of the discharge, a second glow discharge tube connected to said first tube and having an anode and an elongated cathode, the extent of glow on said cathode being an indication of the pressure of said gas, and a housing enclosing said tubes and magnetic means and provided with an opening for observing the glow on said cathode, said housing being grounded during the operation of the device.

12. A method of measuring the pressure of a gas, comprising the steps of producing in the gas a glow discharge between two electrodes, decreasing the ignition voltage and increasing the current intensity of the discharge by producing in the vicinity of the discharge a magnetic field whose magnetic lines of force form an angle of more than 40° with the electric lines of force between the electrodes, and determining the pressure of the gas from the intensity of the discharge.

FRANS MICHEL PENNING.